(12) United States Patent
Kang

(10) Patent No.: US 12,741,570 B2
(45) Date of Patent: Sep. 22, 2026

(54) ROTATION SUPPORTING DEVICE OF SWIVEL SEAT

(71) Applicant: DAS CO., LTD, Gyeongju-si (KR)

(72) Inventor: Sin Gon Kang, Yongin-si (KR)

(73) Assignee: DAS CO., LTD, Gyeongju-si (KR)

( * ) Notice: Subject to any disclaimer, the term of this patent is extended or adjusted under 35 U.S.C. 154(b) by 236 days.

(21) Appl. No.: 18/396,190

(22) Filed: Dec. 26, 2023

(65) Prior Publication Data

US 2024/0278694 A1 Aug. 22, 2024

(30) Foreign Application Priority Data

Feb. 22, 2023 (KR) ........................ 10-2023-0023637

(51) Int. Cl.
*B60N 2/14* (2006.01)
*B60N 2/90* (2018.01)

(52) U.S. Cl.
CPC *B60N 2/14* (2013.01); *B60N 2/90* (2018.02)

(58) Field of Classification Search
CPC ........................................................ B60N 2/14
See application file for complete search history.

(56) References Cited

U.S. PATENT DOCUMENTS

2020/0086769 A1 3/2020 Aktas et al.
2024/0391364 A1 * 11/2024 Mochizuki ............... B60N 2/14

FOREIGN PATENT DOCUMENTS

CN 210591489 U 5/2020
DE 102019124635 A1 3/2020
JP 08113065 A 5/1996
JP H10217811 A * 8/1998 .............. F16C 33/41
JP 2000006695 A * 1/2000
KR 102435303 B1 * 8/2022 ............... B60N 2/14
WO WO-2023225397 A1 * 11/2023 ............... B60N 2/14

OTHER PUBLICATIONS

Office Action for KR application No. 10-2023-0023637, dated Jun. 29, 2025, 5 pages.
Korean Office Action for KR application No. 10-2023-0023637, dated Sep. 20, 2024, 5 pages.
German Office Action for DE application No. 10 2023 213 039.4, dated Nov. 4, 2024, 5 pages.

* cited by examiner

*Primary Examiner* — Timothy J Brindley
(74) *Attorney, Agent, or Firm* — Renner, Otto, Boisselle & Sklar, LLP; Christopher P. Harris

(57) ABSTRACT

A rotation support device of a swivel seat is provided, which not only obtains a stable bending rigidity even at a rotation position at any angle among the entire rotating section of a seat, but also maintains a constant rotation speed over the entire range of the rotating section by guiding and buffering functions of a sliding friction member, thereby providing more excellent operation sensibility. The rotation support device includes: a fixed frame which is installed on a body of a vehicle; a rotating frame which is rotatably installed with respect to the fixed frame; and a rotating sliding portion which is installed to be able to contact an area of an entire section of a rotation direction of the rotating frame with respect to the fixed frame in such a contacting manner that a buffer function is continuous. The rotating sliding portion includes sliding friction members.

11 Claims, 9 Drawing Sheets

ROTATION SUPPORTING DEVICE OF SWIVEL SEAT

CROSS-REFERENCE TO RELATED APPLICATIONS

The present application claims priority to Korean Patent Application No. 10-2023-0023637, filed Feb. 22, 2023, the entire contents of which is incorporated herein for all purposes by this reference.

FIELD

The present disclosure relates to a rotation support device of a swivel seat, and more particularly to a rotation support device of a swivel seat, which not only obtains a stable bending rigidity over the entire rotating section of a seat, but also maintains a constant rotation speed over the entire range of the rotating section by guiding and buffering functions of a sliding friction member, thereby providing more excellent operation sensibility and enhancing the quality and performance.

BACKGROUND

In general, a swivel seat includes a fixed frame that is fixed to a floor panel in the interior of a vehicle, a rotating frame that is rotatably installed over the fixed frame and is mounted on the bottom of the seat and supports, and a drive unit that produces the rotation of the rotating frame with respect to the fixed frame or restrain the rotation at a specific position.

Accordingly, in a conventional swivel seat, seat modes can be variously switched by variably adjusting the rotation angle in the interior of a vehicle. For example, the modes that can be switched in the conventional swivel seat can be broadly divided into a driving mode in a front-viewing position, a meeting mode in a rear-viewing position, and a getting on and off mode in a rotation position of approximately 45 degrees.

As a result, as the conventional swivel seat has a structure in which the switchable modes of the seat are set to be limited to the positions of a few specific modes, the conventional swivel seat has a structural disadvantage in that a passenger is not able to select and switch the seat mode settings at various rotation angles. In other words, the conventional swivel seat is not able to expand the consumer's choice by variously setting the seat mode.

This results from a fact that a part that can limit and control the rotation position of the rotating frame relative to the fixed frame is installed locally with limited to a specific position with respect to the center of rotation set by the fixed frame.

Also, in the conventional swivel seat, since the part that can limit the rotation position of the rotating frame relative to the fixed frame is installed locally with limited to a specific position with respect to the center of rotation set by the fixed frame, when the angle of the seat is changed, there is a structural problem that not only can stable bending rigidity not be obtained over the entire section of the rotation range, but also it is not possible to secure a constant rotation speed over the entire rotating section of the seat and more stable buffer function.

Also, in the conventional swivel seat, a rotating sliding portion that allows the rotation of the rotating frame with respect to the fixed frame is composed of a bearing member that connects a plurality of steel balls in the form of an annular band, so that the shape dimensional dependence on a member in contact with the steel ball is inevitably high. As a result, not only is the moldability of the part deteriorated but also a gap is generated during rotation and operation sensibility is distributed. Also, vibration sound is highly likely to be generated from the steel ball during BSR vibration. Above all, a gap is generated according to the distribution of the shape dimension when the part is manufactured, and also the operation sensibility is significantly reduced. Therefore, there is a requirement for the improvement of this.

SUMMARY

The purpose of the embodiment of the present disclosure is to provide a rotation support device of a swivel seat, which not only obtains a stable bending rigidity even at a rotation position at any angle among the entire rotating section of a seat, but also maintains a constant rotation speed over the entire range of the rotating section by guiding and buffering functions of a sliding friction member, thereby providing more excellent operation sensibility.

One embodiment is a rotation support device of a swivel seat. The rotation support device includes: a fixed frame which is installed on a body of a vehicle; a rotating frame which is rotatably installed with respect to the fixed frame; and a rotating sliding portion which is installed to be able to contact an area of an entire section of a rotation direction of the rotating frame with respect to the fixed frame in such a contacting manner that a buffer function is continuous. The rotating sliding portion comprises a sliding friction member having a buffer structure through multiple contacts which are concentrically arranged with respect to a center of rotation set by the fixed frame.

The rotation support device for the swivel seat according to the embodiment of the present disclosure maintains a constant rotation speed over the entire range of the rotating section by guiding and buffering functions of a sliding friction member provided between the fixed frame and the rotating frame of the seat, thereby providing more excellent operation sensibility and enhancing the quality and performance of the seat.

In particular, according to the embodiment of the present disclosure, the rotating sliding portion constituting the sliding friction member provides a buffer structure through multiple contacts between the fixed frame and the rotating frame, so that it is possible to expect the improved buffer function and to provide a more stable rotation support structure by increasing the rotation radius relative to the rotating sliding portion.

Also, in the rotation support device for the swivel seat according to the embodiment of the present disclosure, a stable bending rigidity can be obtained even at a rotation position at any angle among the entire rotating section of a seat through the medium of the sliding friction member, thereby enabling mode switching to a wider variety of angles, including a talk mode, a getting on and off mode, and a picnic mode, which are required by the swivel seat.

In particular, the rotation support device for the swivel seat according to the embodiment of the present disclosure includes an integral lower J hook and an upper J-hook. The lower J hook is installed to be continuously coupled over the entire perimeter with respect to the center of rotation of the fixed frame. The upper J hook is installed on the rotating frame and is assembled in a catching structure with respect to the lower J hook. Accordingly, it is possible to ensure stable rigidity against external loads at any position and to maintain complementary rigidity with the fixed frame.

Also, in the rotation support device for the swivel seat according to the embodiment of the present disclosure, the upper J hook is assembled to the rotating frame in an insertion-type press-fit structure using a stud pin, and thus, a welding process can be omitted. Therefore, it is possible not only to simplify the product assembly process but also to obtain an advantageous effect on the management of the dimensional distribution of parts.

DETAILED DESCRIPTION

Figure 1:
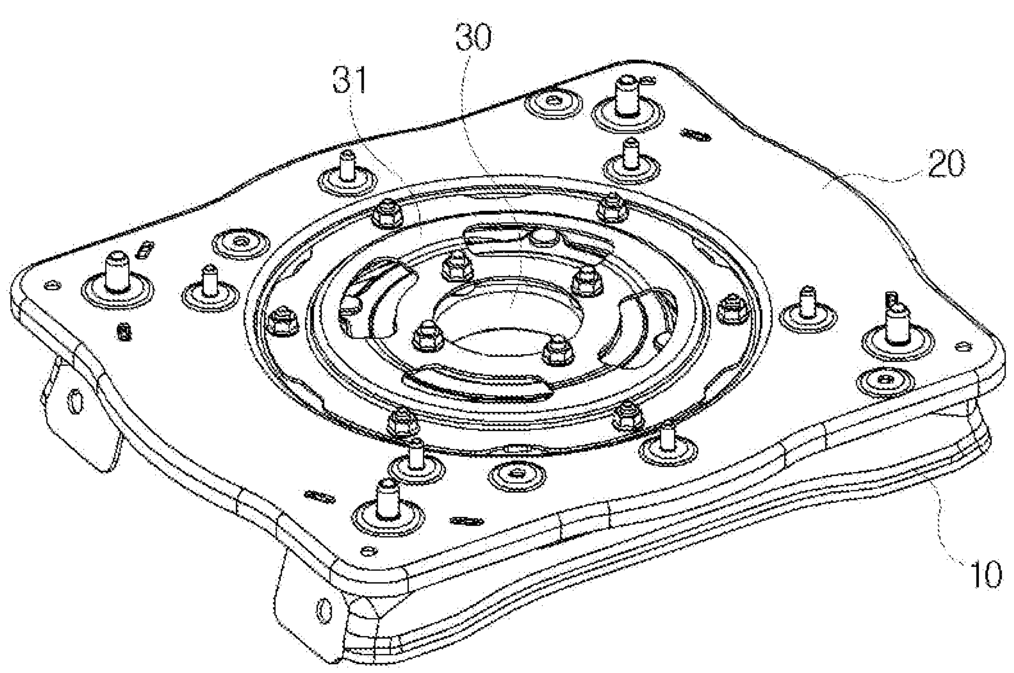
FIG. 1 is a perspective view showing an assembled state of a swivel seat to which an embodiment of the present disclosure is applied.
Figure 2:
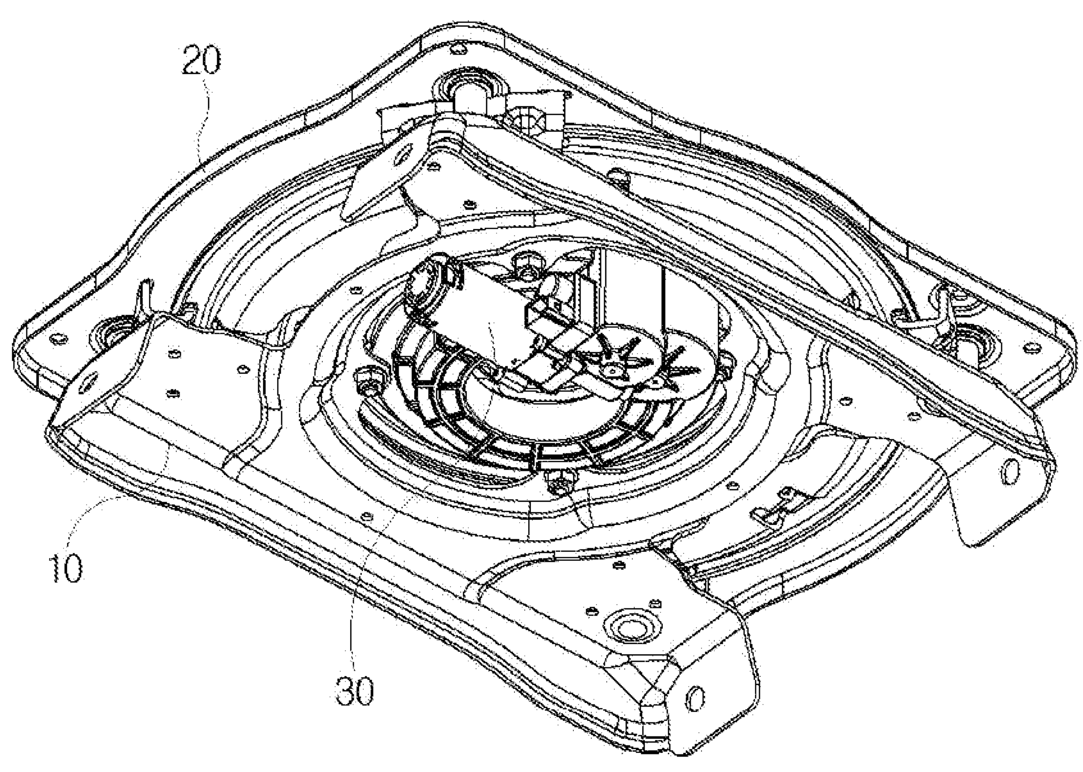
FIG. 2 is a bottom perspective view of FIG. 1.

Hereinafter, preferred embodiments of the present disclosure will be described in detail with reference to the accompanying drawings.

Referring to FIGS. 1 to 4, a swivel seat to which the embodiment of the present disclosure is applied includes a fixed frame 10 that is fixed to a floor panel in the interior of a vehicle, a rotating frame 20 that is rotatably installed over the fixed frame 10 and fixedly seats and mounts a cushion frame of the seat thereon, a drive unit 30 that is installed on the fixed frame 10 and provides not only a rotational driving force to the rotating frame 20 but also a brake function capable of stopping the rotating frame at an appropriate rotation position. In this case, the rotating frame 20 is formed to have a structure that allows the rotating frame to be interlockably connected to the drive unit through the medium of a ring-shaped mounting bracket 31.

A rotation support device of the swivel seat includes a rotating sliding portion that is installed to be able to contact an area of the entire section of the rotation direction of the rotating frame 20 with respect to the fixed frame 10 in such a contacting manner that a buffer function is continuous.

In this case, the rotating sliding portion may include a friction member that is made of a plurality of sliding buffer materials concentrically arranged with respect to a center of rotation set by the fixed frame 10.

Also, as shown in FIGS. 3 to 6, the rotation support device for the swivel seat according to the embodiment of the present disclosure further includes a single lower J hook 40 and a plurality of upper J hooks 50. The lower J hook 40 is continuously installed on a concentric circle along the entire perimeter with respect to the center of rotation set by the fixed frame 10. The plurality of upper J hooks that is individually installed at a local position with respect to the rotating frame 20 and is arranged to concentrically face the lower J hook 40.

The lower J hook 40 is formed in the form of a ring-shaped plate structure and is installed to be fixed to the top surface of the fixing frame 10. For example, the lower J hook 40 may be installed to be firmly fixed to the top surface of the fixed frame 10 by using a welding joint structure. Also, the lower J hook 40 is integrally provided with a downward bent portion 41 that is bent downward and outward along the entire perimeter of the edge thereof, a contact surface 42 that extends from the downward bent portion 41 and has a structure disposed substantially horizontally toward the bottom of the rotating frame 20, and an inner inclined surface 43 that extends from the contact surface 42 and is bent downward and inward.

The upper J hook 50 is formed in the form of a single circular arc-shaped structure and is installed to have a structure supported downward with respect to the rotating frame 20. In particular, the upper J hook 50 is formed to have a plurality of divided structures that is concentrically arranged with respect to a center of rotation set by the fixed frame 10 and faces the lower J hook 40 in an up and down direction. Also, the upper J hook 50 is integrally provided with an upward bent portion 51 that is bent upward along the entire perimeter of one side end thereof and faces the downward bent portion 41 at an appropriate distance.

As a result, the rotating frame 20 is not lifted upward and separated from the fixed frame 10 when a collision accident occurs. This results from a coupling structure (shown in FIG. 3) by a catching structure between the downward bent portion 41 of the lower J hook 40 and the upward bent portion 51 of the upper J hook 50.

Meanwhile, in the embodiment of the present disclosure, as shown in FIGS. 3 to 9, the rotating sliding portion includes a sliding friction member having a buffer structure through multiple contacts including a first sliding member 110, a second sliding member 120, and a third sliding member 130 which are concentrically arranged with respect to a center of rotation set by the fixed frame 10.

Here, the rotating sliding portion is configured not only to provide a more stable rotation support structure by further increasing a rotation radius set by a contact portion with respect to the center of rotation of the fixed frame 10 but also to produce an effect of improving a buffer function through multiple contacts. The detailed configuration of the rotary sliding portion for this purpose is as follows.

Figure 3:
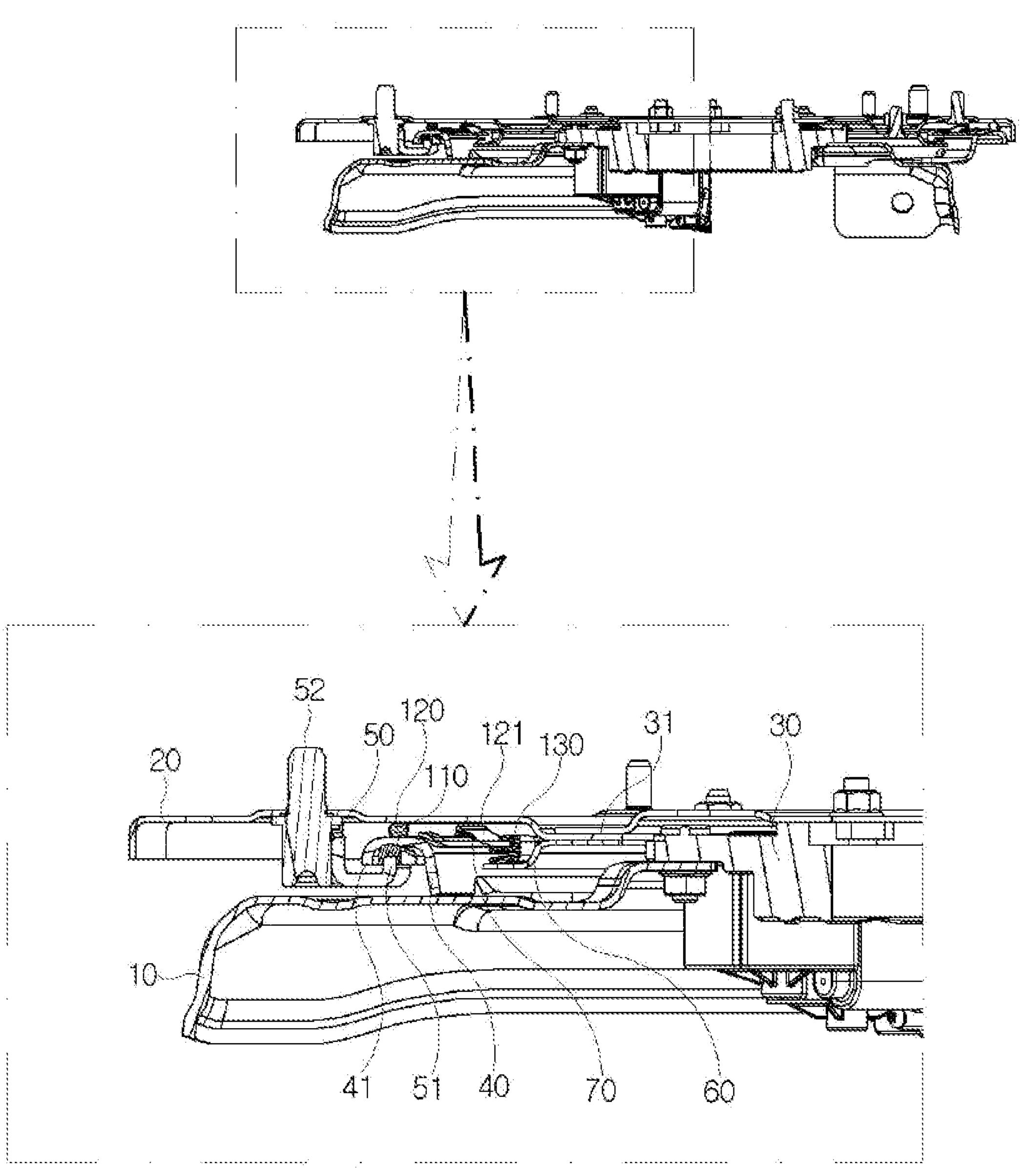
FIG. 3 is a cross-sectional view for describing an internal structure of a rotation support device of the swivel seat according to the embodiment of the present disclosure.
Figure 4:
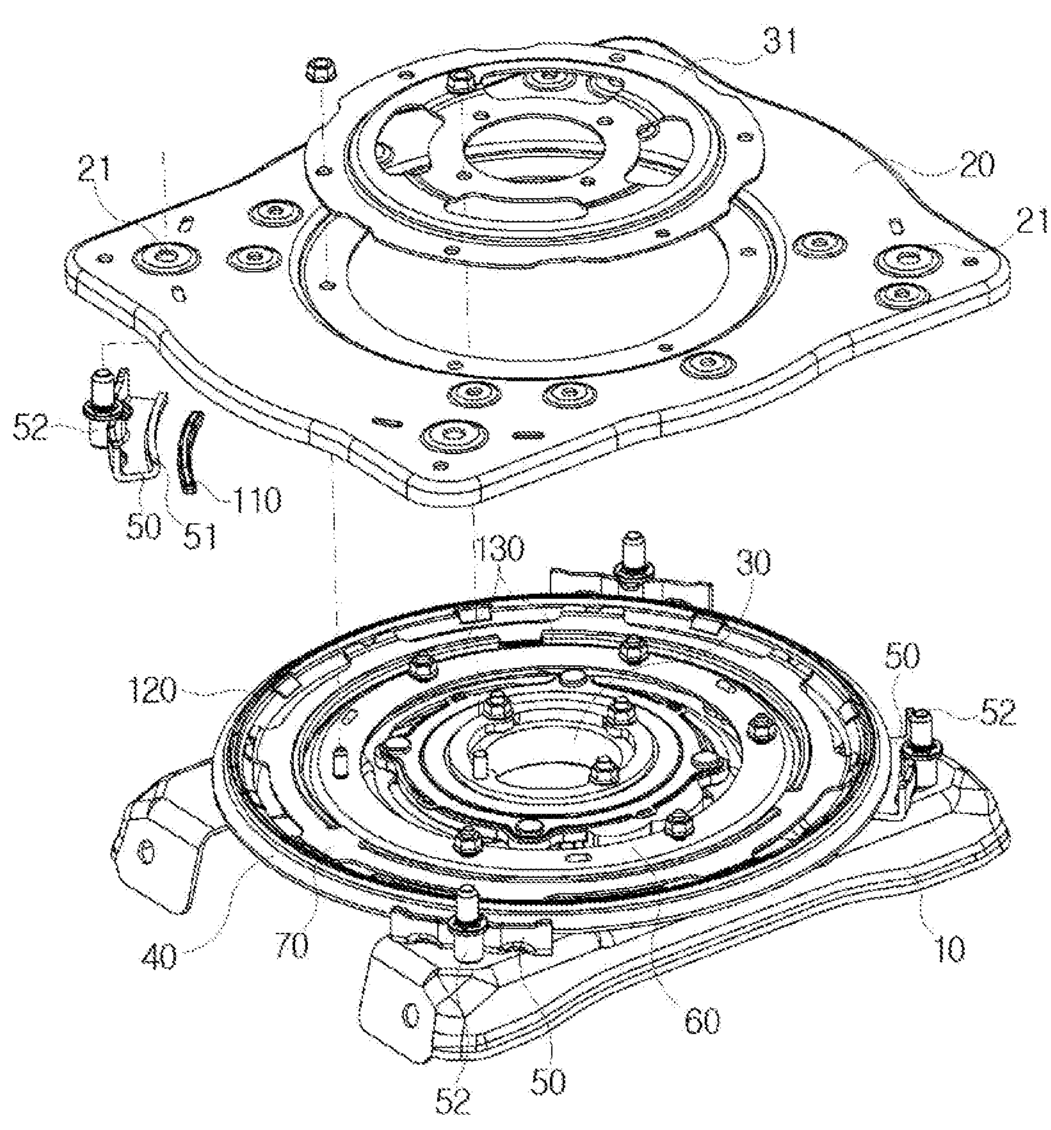
FIG. 4 is a perspective view showing that only a rotation frame and a mounting bracket are disassembled from the rotation support device of the swivel seat according to the embodiment of the present disclosure.

First, as shown in FIGS. 3 and 4, the first sliding member 110 is installed on the upward bent portion 51 of the upper J hook 50 and is arranged to be able to continuously contact the downward bent portion 41 of the lower J hook 40. For reference, referring to FIG. 4, unlike the structure in which the upper J hook 50 is coupled to the bottom of the rotating frame 20, they are shown as being separated (indicated by a dash-dotted line). Simultaneously with this, FIG. 4 also shows a structure in which the upper J hook 50 is assembled corresponding to the lower J hook 40 at an appropriate distance.

Figure 5:
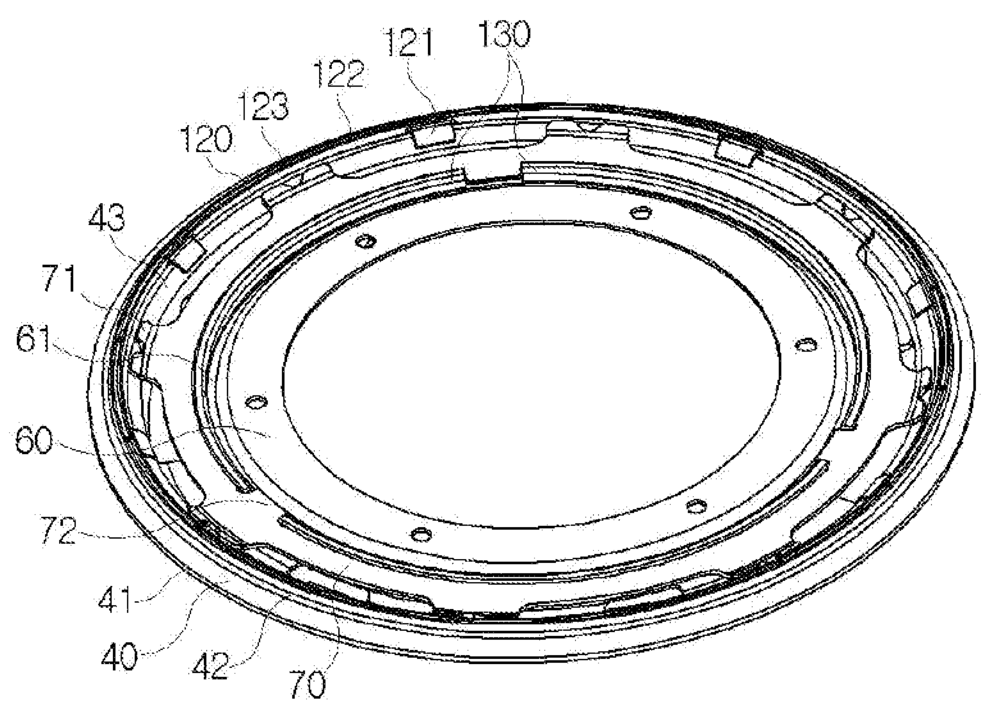
FIG. 5 is an enlarged perspective view showing only an assembled state of a lower J hook, a rotation guide member, and a fixed guide member, and an assembled state of a second sliding member and a third sliding member, as main parts of the rotation support device of the swivel seat according to the embodiment of the present disclosure.

Referring to FIGS. 3, 4, and 5, the lower J hook 40 is installed to be firmly fixed to the top surface of the fixed frame 10. Also, the contact surface 42 is configured to be integrally provided with the top surface of the lower J hook 40 in such a way as to be continuously disposed along the entire perimeter over the same radius with respect to the center of rotation of the fixed frame 10.

Also, the upper J hook 50 is installed to protrude downward with respect to the bottom surface of the rotating frame 20 and is firmly fixed. In particular, the upper J hook 50 is configured to be fixed at a specific local position among the entire perimeter of the rotating frame 20. For example, the upper J hook 50 may be configured to be assembled at each corner of the rotating frame 20 in an attachable and detachable manner. However, the installation position of the upper J hook 50 with respect to the rotating frame 20 is not limited to each corner. The upper J hook 50 may be installed at an optimal position for the purpose of the stable rotation support of the rotating frame 20 with respect to the fixed frame 10.

For this purpose, the upper J hook 50 is installed to protrude downward through the medium of a stud pin 52 that can be inserted into an assembly hole 21 of the rotating frame 20. For example, the upper J hook 50 may be firmly weld bonded to one side of a lower portion of the stud pin 52. In this case, the first sliding member 110 is inserted into and mounted on the upward bent portion 51 formed on one side end of the lower J hook 40.

Also, the downward bent portion 41 provided on the lower J hook 40 is bent downward toward the upper J hook 50 in order to receive the upward bent portion 51. Here, the downward bent portion 41 sets an appropriate separated space for contact with the top surface of the first sliding member 110. Accordingly, the lower inner surface of the downward bent portion 41 can continuously contact the top surface of the first sliding member 110.

Figure 7:
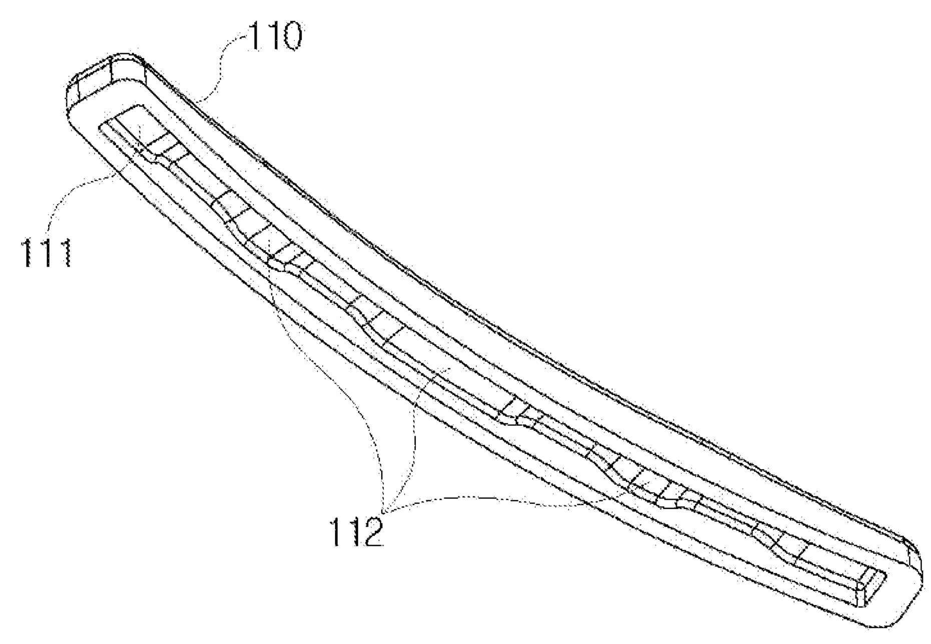
FIG. 7 shows a bottom portion of a first sliding member shown respectively in FIGS. 3 and 4.

To this end, as shown in FIG. 7, the first sliding member 110 is formed in the form of a single circular arc-shaped part which has a concave assembly groove 111 formed in the bottom surface thereof so as to be fitted to the upward bent portion 51 of the upper J hook 50.

In this case, it would be more desirable that the assembly groove 111 should be integrally provided with buffer protrusions 112 that protrude alternately downward at spaced apart positions for elastic deformation of the first sliding member 110 in the thickness direction.

Accordingly, the first sliding member 110 is mounted on the upward bent portion 51 of the upper J hook 50 and stably come into contact with the inner portion of the downward bent portion 41 of the lower J hook 40, so that it is possible to increase the rotation radius relative to the rotating sliding portion. As a result, the first sliding member 110 constructs a more stable rotation support structure by setting the rotation radius to the maximum, so that it is possible not only to exert a stronger supporting force against external loads in the event of a collision accident but to deal with more effectively up and down vibration during driving.

Meanwhile, as shown in FIGS. 3 to 6, the second sliding member 120 is arranged to be able to contact between the bottom surface of the rotating frame 20 and the top surface of the lower J hook 40. That is, the second sliding member 120 is seated on the contact surface 42 positioned on the top surface of the lower J hook 40 and is installed to be in contact with the bottom surface of the rotating frame 20.

Figure 6:
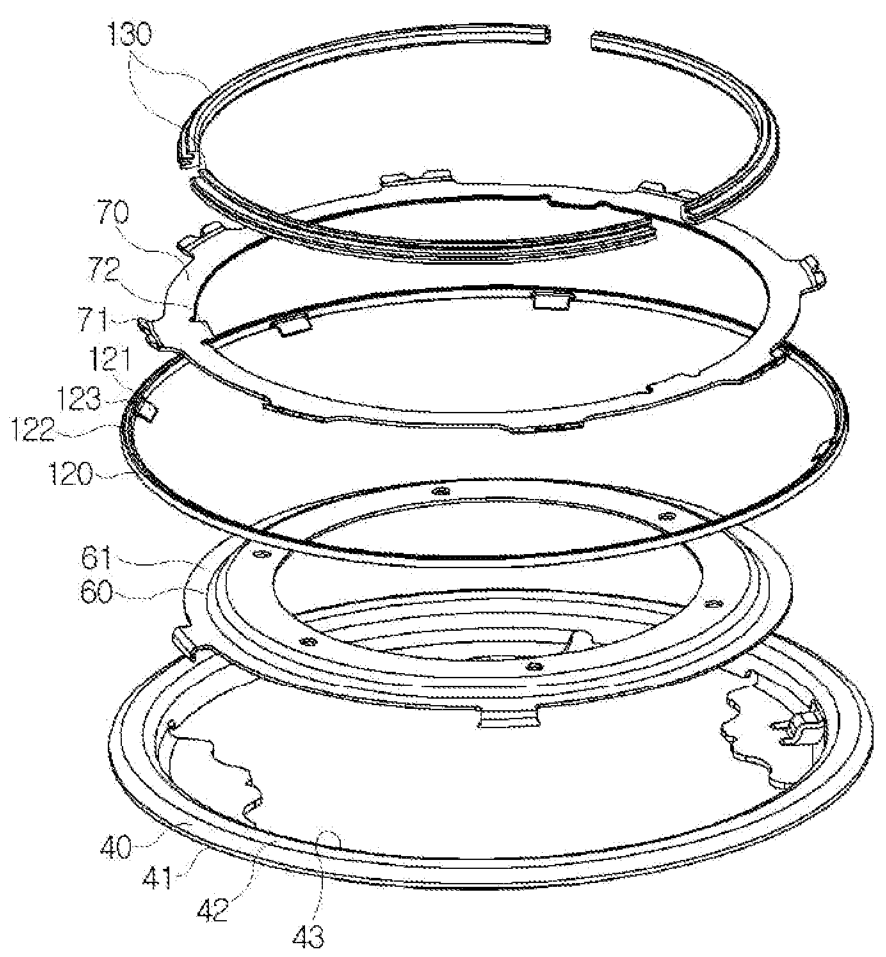
FIG. 6 is a perspective view showing that constituting members shown in FIG. 5 are disassembled respectively.
Figure 8:
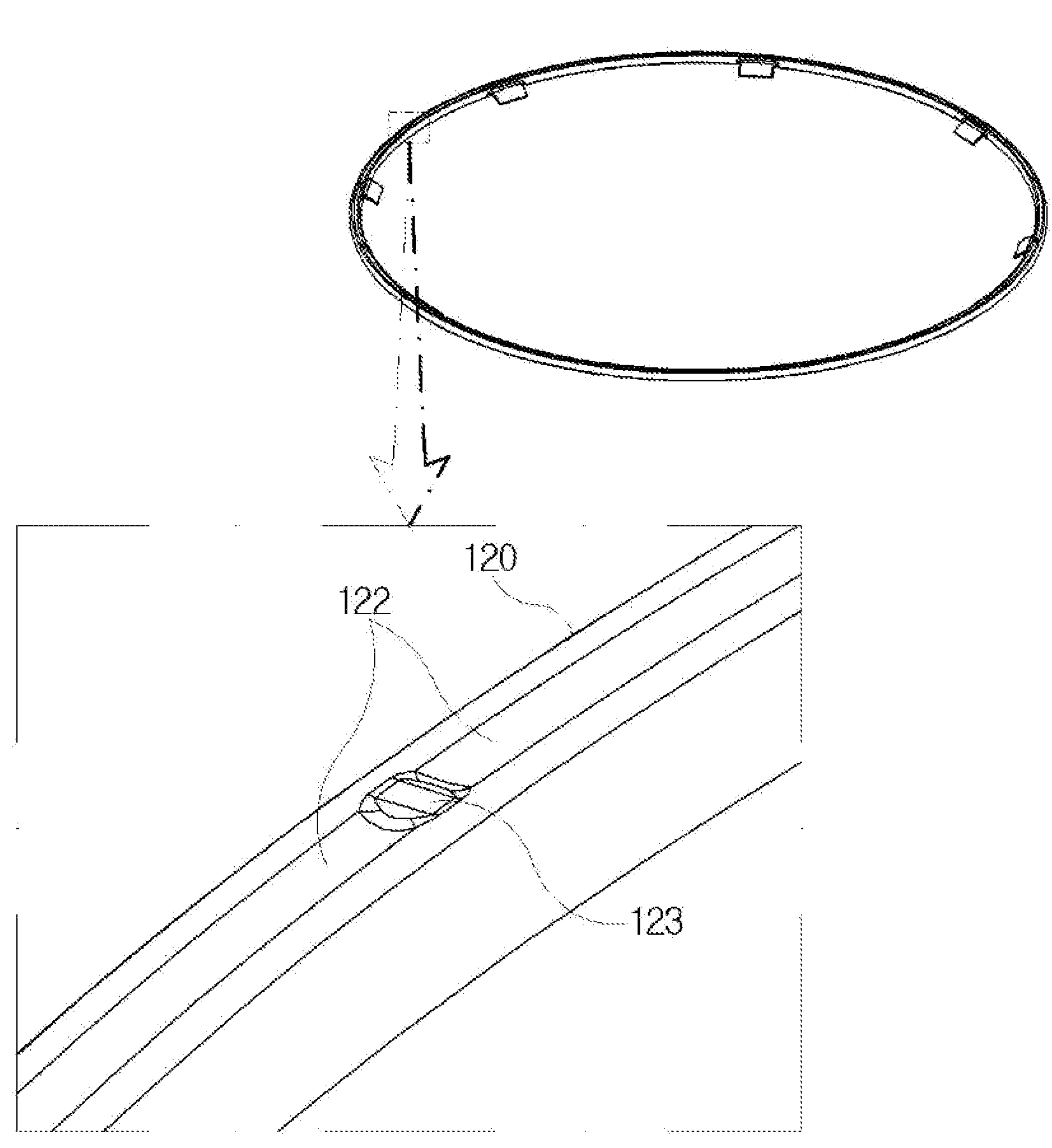
FIG. 8 shows the second sliding member shown respectively in FIGS. 3 to 6.

For this purpose, the second sliding member 120 is an integral ring-shaped structure, and is, as shown in FIGS. 5, 6, and 8, integrally provided with an inclined protrusion 121 which is disposed on the inner peripheral surface located on the radially inner side in such a way as to be able to contact with the inner inclined surface 43 of the lower J hook 40. Also, the second sliding member 120 is provided with a receiving groove 122 which is for forming a storage space for lubricating oil and is formed continuously in the top and bottom surfaces thereof respectively along the entire perimeter thereof. In particular, the receiving groove 122 is provided with a dividing protrusion 123 which radially divides the storage space for lubricating oil. In this case, it would be desirable that a plurality of the inclined protrusions 121 should be provided at radially spaced positions over the entire perimeter of the second sliding member 120. It would be desirable that a plurality of the dividing protrusions 123 should be provided on the top and bottom surfaces respectively at radially spaced positions over the area located on the entire perimeter of the receiving groove 122.

Also, the radially spaced position of the second sliding member 120 with respect to the center of rotation of the fixed frame 10 may be set in various forms.

For example, the radially spaced position of the second sliding member 120 with respect to the center of rotation of the fixed frame 10 may be, as shown in FIG. 3, set not to be less than the radially spaced position of the first sliding member 110. That is, the radially spaced position of the second sliding member 120 with respect to the center of rotation of the fixed frame 10 may be set to be equal to or greater than the radially spaced position of the first sliding member 110.

Alternatively, the radially spaced position of the second sliding member 120 with respect to the center of rotation of the fixed frame 10 may be set to be less than the radially spaced position of the first sliding member 110. That is, the radially spaced position of the second sliding member 120 with respect to the center of rotation of the fixed frame 10 may be set not to be greater than the radially spaced position of the first sliding member 110.

Accordingly, the first sliding member 110 and the second sliding member 120 can form a buffer structure through multiple contacts. In particular, the first sliding member 110 and the second sliding member 120 can increase the rotation radius relative to the rotating sliding portion. As a result, in the swivel seat, the first sliding member 110 and the second sliding member 120 construct a more stable rotation support structure, so that it is possible not only to exert a stronger supporting force against external loads in the event of a collision accident but to deal with more effectively up and down vibration during driving.

Meanwhile, as shown in FIGS. 3 to 6, the third sliding member 130 is mounted in a form of being supported with respect to a fixed guide member 70 installed to be coupled to the lower J hook 40 and is installed to be able to contact with a rotation guide member 60. Here, the rotation guide member 60 is fastened together to a fastening portion between the rotating frame 20 and the mounting bracket 31, which allows the rotation guide member 60 to have a structure that can be interlocked with the drive unit 30.

In this case, the rotation guide member 60 is integrally provided with a seating surface portion 61 that seats and supports the bottom surface of the third sliding member 130 on the top surface thereof. Here, it is more preferable that the seating surface portion 61 should be provided continuously along the entire perimeter of the radially outer side from the edge of the rotation guide member 60.

Accordingly, the seating surface portion 61 can stably support the bottom surface of the third sliding member 130, and simultaneously with this, continuously contact with the bottom surface of the third sliding member 130. In particular, the seating surface portion 61 has a circular planar structure. This is advantageous in obtaining dimensions for seating and supporting the third sliding member 130. Also, above all, this enables a constant operating force to be maintained through stable contact with the third sliding member 130 when rotating, thereby providing advantages in operation sensibility and vibration absorption.

For example, the third sliding member 130 may be composed of a plurality of circular arc divided-shaped structures. In this case, the third sliding member 130 is supported on a free end of the radially inner side of the fixed guide member 70 installed on the lower J hook 40.

For this purpose, the fixed guide member 70 is an integral ring-shaped structure, and is, as shown in FIGS. 5 and 6, provided with an outer protrusion 71 and an inner protrusion 72. The outer protrusion 71 is disposed on the outer peripheral surface located on the radially outer side and extends outwardly so as to be able to contact with the inner inclined surface 43 of the lower J hook 40. The inner protrusion 72 is disposed on the inner peripheral surface located on the radially inner side and extends inwardly in order to divide the third sliding member 130 in the form of a circular arc and receive it. In this case, it is preferable that the outer protrusion 71 and the inner protrusion 72 should be provided respectively in plural numbers at radially spaced positions over the entire perimeter of the fixed guide member 70.

Figure 9:
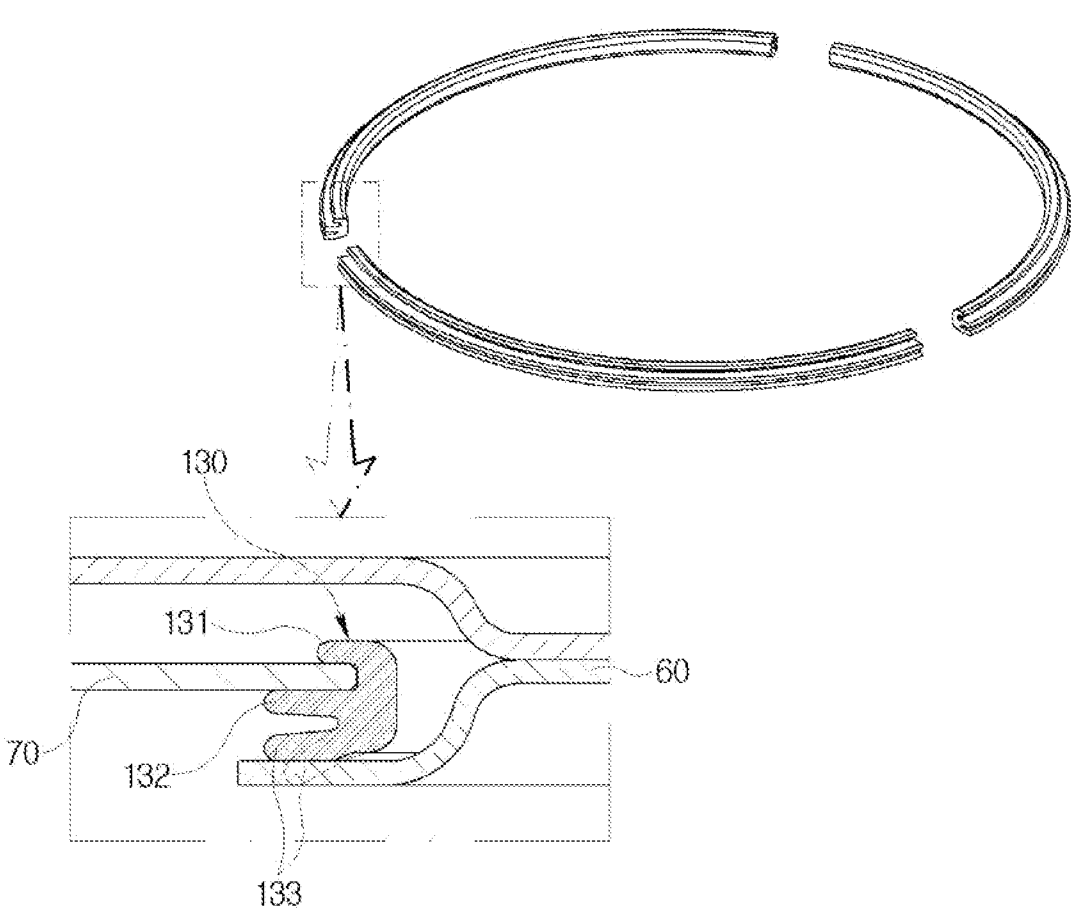
FIG. 9 shows the third sliding member shown respectively in FIGS. 3 to 6 and shows a partially enlarged cross sectional structure of an installed state of the third sliding member.

Also, as shown in FIG. 9, the third sliding member 130 includes an upper protrusion 131 and a middle protrusion 132 which form an insertion groove allowing the third sliding member 130 to be inserted into the inner surface of the fixed guide member 70. A lower protrusion 133 is integrally provided on the bottom of the middle protrusion 132. The lower protrusion 133 is bent obliquely downward at an appropriate angle for elastic contact with the seating surface portion 61 of the rotation guide member 60.

That is, the third sliding member 130 is integrally provided with the upper protrusion 131, the middle protrusion 132, and the lower protrusion 133 with respect to the cross section. In this case, the insertion groove allowing the third sliding member 130 to be inserted into the inner surface of the fixed guide member 70 is formed between the upper protrusion 131 and the middle protrusion 132. In particular, it is more desirable that the lower protrusion 133 should be bent obliquely downward from the middle protrusion 132 for elastic contact with the seating surface portion 61 of the rotation guide member 60.

As a result, after assembly compared to before assembly, the third sliding member 130 is able to construct an absorption and buffer structure for dimensional distribution of parts through the medium of elastic compression (indicated by a dotted line in FIG. 9) by the downward inclined lower protrusion 133.

Also, the radially spaced position of the third sliding member 130 with respect to the center of rotation of the fixed frame 10 is set to be less than the radially spaced position of the first sliding member 110 and the radially spaced position of the second sliding member 120, respectively. That is, the installation position of the third sliding member 130 corresponds to a position where a conventional bearing member including steel balls is installed.

Accordingly, the third sliding member 130, together with the first sliding member 110 and the second sliding member 120, can form a buffer structure through multiple contacts. Through this, the rotating sliding portion is able to improve a buffer function through multiple contacts. Also, in the swivel seat, the first sliding member 110, the second sliding member 120, and the third sliding member 130 construct a more stable rotation support structure, so that it is possible not only to exert a stronger supporting force against external loads in the event of a collision accident but to deal with more effectively up and down vibration during driving.

In particular, the radially spaced position of the first sliding member 110 and the radially spaced position of the second sliding member 120 are located more radially outward than the third sliding member 130 with respect to the center of rotation of the fixed frame 10. Therefore, compared to a conventional structure, it is possible to increase the rotation radius, and thus, to produces an effect of a more stable rotation support.

Meanwhile, it is desirable that the rotating sliding portion according to the embodiment of the present disclosure should include at least two sliding members out of the first sliding member 110, the second sliding member 120, and the third sliding member 130. For example, the rotating sliding portion may be composed of a combination of the first sliding member 110 and the second sliding member 120, or a combination of the second sliding member 120 and the third sliding member 130. If necessary, a combination of the first sliding member 110 and the third sliding member 130 can also be applied.

Therefore, the rotation support device for the swivel seat according to the embodiment of the present disclosure configured as described above is able to maintain a constant rotation speed by a constant frictional force over the entire range of the rotating section of the seat through guiding and buffering functions by the rotating sliding portion corresponding to the sliding friction member provided between the fixed frame 10 and the rotating frame 20. Through this, it is possible to provide more excellent operation sensibility and to enhance the quality and performance of the seat.

That is, when the seat rotates, the first sliding member 110, the second sliding member 120, and the third sliding member 130, which are rotating sliding members, can continuously exert a constant buffering friction force respectively while being subjected to a load in the thickness direction. This can ensure a constant rotation speed over the entire range of the rotating section of the seat and provide excellent operation sensibility by implementing a comfortable buffer function.

Also, the rotation support device for the swivel seat according to the embodiment of the present disclosure can obtain a stable bending rigidity even at a rotation position at any angle among the entire rotating section of the seat through the medium of the rotating sliding portion that is a sliding friction member, thereby enabling mode switching to a wider variety of angles, including a talk mode, a getting on and off mode, and a picnic mode, which are required by the swivel seat.

In particular, in the rotation support device for the swivel seat according to the embodiment of the present disclosure, through the rotation support structure including the integral lower J hook 40 that is installed continuously over the entire perimeter with respect to the center of rotation of the fixed frame 10, and the single product type upper J hook 50 that is installed at a local position with respect to the rotating frame 20 and mounts the first sliding member 110, which is a sliding friction member, at a position facing the lower J hook 40, appropriate bending rigidity can be obtained, and through this, a complementary function of rigidity can be implemented.

Also, in the rotation support device for the swivel seat according to the embodiment of the present disclosure, the upper J hook 50 is assembled to the rotating frame 20 in an insertion-type press-fit structure using the stud pin 52, thereby omitting a welding process. Accordingly, it is possible not only to simplify the product assembly process but also to obtain an advantageous effect on the management of the dimensional distribution of parts.

The foregoing is only an illustrative description of the spirit of the present invention. Various modifications and changes may be made therein without departing from the essential features of the present invention by those skilled in the art. Therefore, the embodiments of the present invention are not intended for limiting the spirit but intended for describing the spirit of the present invention, and the spirit and scope of the present invention are not limited by the embodiments. Therefore, the scope of the present invention should be construed by the appended claims. All the spirits within the scope equivalent to the claims should be construed to be included in the right scope of the present invention.

REFERENCE NUMERALS

| | |
|---|---|
| 10: Fixed Frame | 20: Rotating Frame |
| 30: Drive Unit | 31: Mounting Bracket |
| 40: Lower J Hook | 41: Downward Bent Portion |
| 42: Contact Surface | 43: Inner Inclined Surface |
| 50: Upper J Hook | 51: Upward Bent Portion |
| 52: Stud Pin | 60: Rotation Guide Member |
| 61: Seating Surface Portion | 70: Fixed Guide Member |
| 71: Outer Protrusion | 72: Inner Protrusion |
| 110: First Sliding Member | 111: Assembly Groove |
| 112: Buffer Protrusion | 120: Second Sliding Member |
| 121: Inclined Protrusion | 122: Receiving Groove |
| 123: Dividing Protrusion | 130: Third Sliding Member |
| 131: Upper Protrusion | 132: Middle Protrusion |
| 133: Lower Protrusion | |

What is claimed is:

1. A rotation support device of a swivel seat, the rotation support device comprising:

a fixed frame which is installed on a body of a vehicle;

a rotating frame which is rotatably installed with respect to the fixed frame; and a rotating sliding portion which is installed to be able to contact the rotating frame along an entire circumferential extent of the rotating frame with respect to the fixed frame in such a contacting manner that a buffer function is continuous, wherein the rotating sliding portion comprises:

a single lower J hook which is continuously installed along an entire perimeter thereof with respect to the center of rotation of the fixed frame;

a plurality of upper J hooks which is installed at a local position with respect to the rotating frame and is arranged to concentrically face the lower J hook; and a first sliding member which is installed on the upper J hook and is arranged to be able to continuously contact the lower J hook, wherein the first sliding member comprises an assembly groove formed in a bottom surface thereof so as to be fitted to the upward bent portion of the upper J hook, wherein the assembly groove is provided with a buffer protrusion that protrudes alternately downward at spaced apart positions for elastic deformation of the first sliding member in a thickness direction, and wherein the rotating sliding portion comprises at least two sliding members configured to provide the buffer function through multiple contacts.

2. The rotation support device of a swivel seat of claim 1, wherein the lower J hook is installed to be fixed to a top surface of the fixing frame and includes a contact surface continuously disposed along an entire perimeter thereof over the same radius with respect to the center of rotation of the fixed frame, and wherein the upper J hook is installed to be fixed to a bottom surface of the rotating frame and is assembled at each corner of the rotating frame in an attachable and detachable manner.

3. The rotation support device of a swivel seat of claim 1, wherein the upper J hook comprises a stud pin which is inserted into an assembly hole of the rotating frame, and an upward bent portion which is coupled to the stud pin, has a free end bent toward the lower J hook, and mounts the first sliding member, and wherein the lower J hook comprises a downward bent portion which is bent toward the upper J hook in order to receive the upward bent portion and forms a space for contact with a top surface of the first sliding member.

4. The rotation support device of a swivel seat of claim 1, wherein the rotating sliding portion further comprises a second sliding member which is arranged to be able to contact between the rotating frame and the lower J hook, and wherein the second sliding member is seated on a top surface of the lower J hook and is installed to be in contact with a bottom surface of the rotating frame.

5. The rotation support device of a swivel seat of claim 4, wherein the second sliding member comprises an inclined protrusion which is disposed on an inner peripheral surface thereof in such a way as to be able to contact with an inner inclined surface of the lower J hook, and a receiving groove which is for forming a storage space for lubricating oil and is formed continuously in top and bottom surfaces thereof respectively along an entire perimeter thereof, and wherein a dividing protrusion for radially dividing the storage space for lubricating oil is provided at spaced positions over an entire perimeter of the receiving groove.

6. The rotation support device of a swivel seat of claim 4, wherein the rotating sliding portion further comprises a third sliding member which is mounted on the lower J hook and is installed to be able to contact with a rotation guide member, wherein the rotation guide member is provided with a seating surface portion that seats and supports a bottom surface of the third sliding member, and wherein the third sliding member is located more radially inward than the first sliding member and the second sliding member with respect to the center of rotation of the fixed frame.

7. A rotation support device of a swivel seat, the rotation support device comprising:

a fixed frame which is installed on a body of a vehicle;

a rotating frame which is rotatably installed with respect to the fixed frame; and a rotating sliding portion which is installed to be able to contact the rotating frame along a circumferential extent of the rotating frame with respect to the fixed frame in such a contacting manner that a buffer function is continuous, wherein the rotating sliding portion comprises:

a single lower J hook which is continuously installed along an entire perimeter thereof with respect to a center of rotation of the fixed frame; and a second sliding member which is disposed to be able to contact between the rotating frame and the lower J hook, wherein the second sliding member comprises an inclined protrusion which is disposed on an inner peripheral surface thereof in such a way as to be able to contact with an inner inclined surface of the lower J hook, and a receiving groove which is for forming a storage space for lubricating oil and is formed continuously in top and bottom surfaces thereof respectively along an entire perimeter thereof, and wherein a dividing protrusion for radially dividing the storage space for lubricating oil is provided at spaced positions over an entire perimeter of the receiving groove.

8. The rotation support device of a swivel seat of claim 7, wherein the rotating sliding portion further comprises a third sliding member which is mounted on the lower J hook and is installed to be able to contact with a rotation guide member, wherein the rotation guide member is provided with a seating surface portion that seats and supports a bottom surface of the third sliding member, and wherein the third sliding member is located more radially inward than the second sliding member with respect to the center of rotation of the fixed frame.

9. The rotation support device of a swivel seat of claim 8, wherein the third sliding member is supported on a fixed guide member installed on the lower J hook.

10. The rotation support device of a swivel seat of claim 9, wherein the fixed guide member comprises an outer protrusion which is disposed on an outer peripheral surface thereof and extends outwardly so as to be able to contact with an inner inclined surface of the lower J hook, and an inner protrusion which is disposed on an inner peripheral surface thereof and extends inwardly in order to divide the third sliding member in the form of a circular arc and receive it.

11. The rotation support device of a swivel seat of claim 9, wherein the third sliding member comprises an upper protrusion and a middle protrusion which form an insertion groove allowing the third sliding member to be inserted into an inner surface of the fixed guide member, wherein a lower protrusion bent obliquely downward for elastic contact with the seating surface portion of the rotation guide member is provided on a bottom of the middle protrusion, and wherein the seating surface portion of the rotation guide member, which comes into contact with the lower protrusion, is formed in a flat shape.

* * * * *